April 9, 1935.    M. SCHWARTZ    1,997,315
APPARATUS FOR TAKING FLASH LIGHT PICTURES
Filed Feb. 20, 1931    2 Sheets-Sheet 1
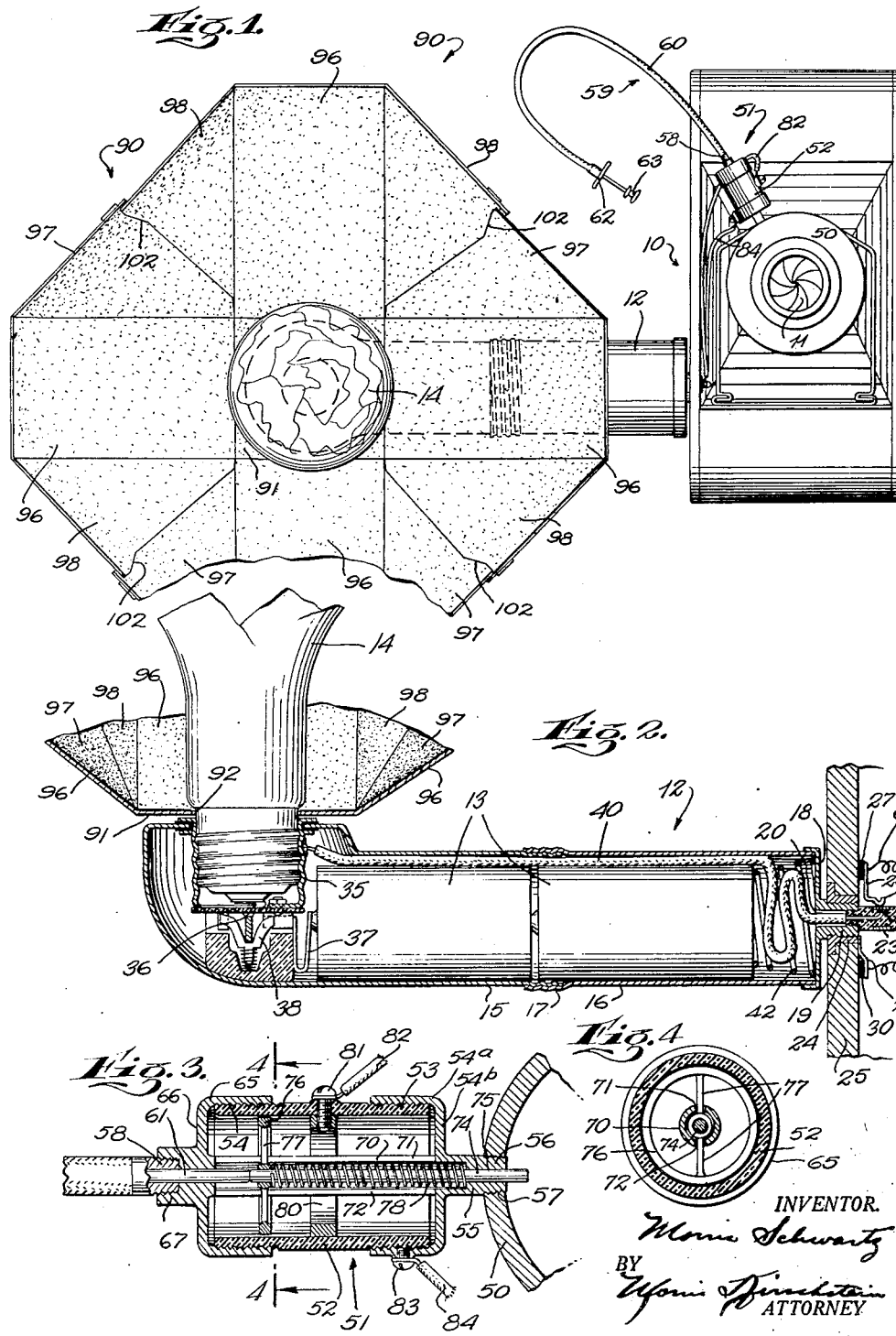

April 9, 1935.　　　M. SCHWARTZ　　　1,997,315
APPARATUS FOR TAKING FLASH LIGHT PICTURES
Filed Feb. 20, 1931　　2 Sheets-Sheet 2
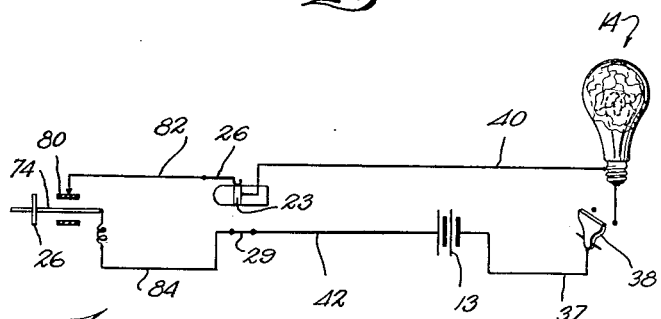
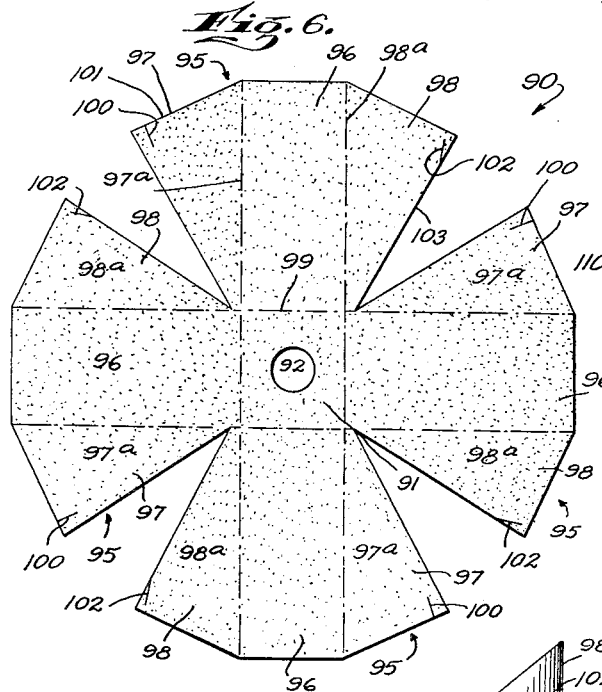
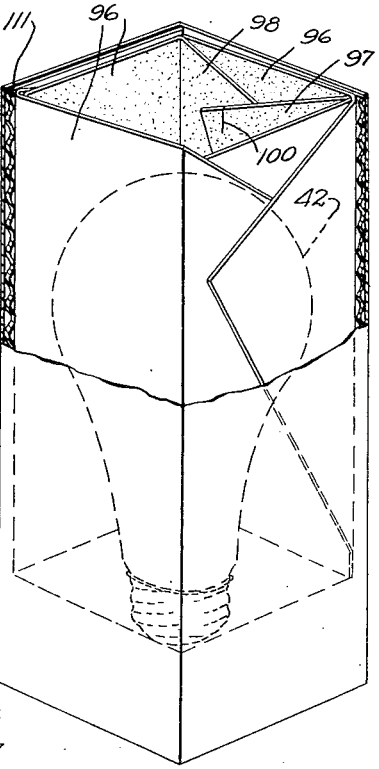
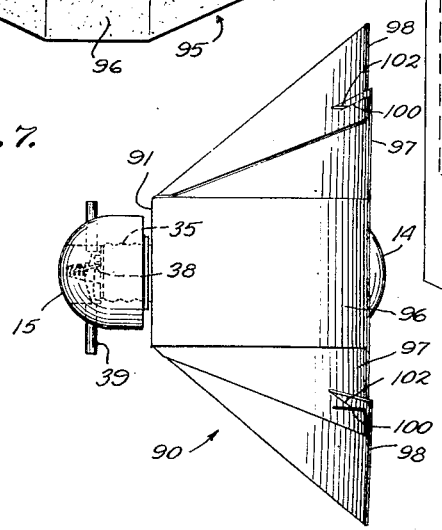
INVENTOR.
Morris Schwartz
BY
Morris Hirschstein
ATTORNEY Patented Apr. 9, 1935

1,997,315

UNITED STATES PATENT OFFICE 1,997,315

APPARATUS FOR TAKING FLASH LIGHT PICTURES

Morris Schwartz, Brooklyn, N. Y.

Application February 20, 1931, Serial No. 517,130

4 Claims. (Cl. 67—29)

This invention relates to apparatus for taking flashlight pictures.

An object of this invention is to provide apparatus of the character described, having highly improved and novel means for simultaneously flashing a flashlamp and actuating a camera shutter whereby the shutter will be open substantially for the same small period of time during which the flashlamp is illuminated.

Another object of this invention is to provide in apparatus of the character described, a highly improved reflector for the flashlamp, the same being adapted to be folded and placed within the usual tubular shipping container for the lamp, and being easy to manipulate, simple and cheap in construction, and extremely light in weight to permit the same to be easily carried by the photographer.

A further object of this invention, is to provide comparatively simple and compact apparatus of the character described, which shall comprise relatively few and simple parts, easy to set up and manipulate, which shall be comparatively inexpensive to manufacture, easy to carry, store and ship, and which shall yet be smooth and positive in operation, safe and clean in use and practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

Certain features including the flexible reflector and container therefor shown, described and claimed in my co-pending application, Serial No. 505,316, filed December 29th, 1930, are shown and described, but not claimed in this application.

In the accompanying drawings, in which is shown one of the various possible illustrative embodiments of this invention, Fig. 1 is a front elevational view of a camera provided with apparatus embodying the invention;

Fig. 2 is an elevational, cross-sectional view of a portion of the camera and the accessories therefor;

Fig. 3 is an enlarged, detail axial cross-sectional view of my improved switch forming part of the apparatus embodying my invention;

Fig. 4 is a cross-sectional view taken on line 4—4 of Fig. 3;

Fig. 5 is a wiring diagram showing the electrical circuit for my apparatus;

Fig. 6 is a top plan view of my improved reflector showing the same in unfolded position;

Fig. 7 is an end view of the battery casing and flashlamp with the reflector in position for use; and Fig. 8 is a perspective view of a package embodying the invention for shipping and storing the flashlamp and my improved reflector.

Referring now in detail to the drawing, 10 designates a photographic camera which may be of any suitable construction, for example, of the kodak type, for taking snapshots or the like pictures, and having a lens shutter 11 adapted to be open for a small period of time, for example 1/25 or 1/50 of a second and automatically closed. The camera 10 and shutter 11 may be of any suitable construction, since any camera now in use may be employed in making apparatus embodying my invention. To this end, my apparatus consists generally of the camera 10 and a casing 12, housing one or more dry cells or batteries 13 for energizing an electric flashlamp 14.

The casing 12 may comprise tubular sections 15 and 16 screwed together as at 17. One of said sections 16 may be provided with an end wall 18 having an outwardly extending screw threaded projection 19 formed with a central opening 20. Screwed or attached in any other suitable manner, within said opening 20 and projecting outwardly therefrom, is a member 22 of insulating material and having an annular metal band 23 thereon, spaced from the screw threaded portion 19. Said portion 19 may be screwed to the usual internally screw threaded member 24 provided in the side wall 25 of the camera 10, for mounting the casing 12 on the camera. Most cameras now in use, are provided with screw threaded members 24 for mounting the camera on a tripod and hence said member 24 may be utilized for mounting the casing 12 on the side of the camera. A metal terminal member 26 may be attached to the inside of the camera wall 25 and insulated therefrom as at 27, said terminal being provided with a spring contant portion 28 adapted to contact the annular band 23, upon attaching the casing to the camera, for the purpose hereinafter described.

Another metal terminal member 29 may be fixed to the inside of the camera wall 25 in contact with the internally screw threaded portion 24, likewise insulated as at 30 from said wall for the purpose described below.

Means is provided for electrically connecting the flashlamp 14 to the terminal members 26 and 29. To this end, there is mounted on the casing portion 15, and insulated therefrom, a screw threaded socket shell 35 preferably disposed at right angles to the axis of said casing 12. Said shell may be provided with the usual central contact 36 adapted to be electrically connected to a fixed terminal piece 37, by means of a snap switch 38 of usual construction, the latter being adapted to be actuated by means of a two-ended push button 39 projecting from the casing. The shell 35 may be connected with the said band 23 by means of a wire 40 disposed within the casing 12 and extending along the length thereof and having an end portion 41 soldered to said band. It will be noted that the dry cells 13 are mounted within the casing 12 in tandem and are urged by means of a coil spring 42 extending between said end wall 18 and the adjacent cell 13 toward the terminal piece 37. The flashlamp 14 is adapted to be attached to the screw shell 35 in the manner of an ordinary electric lamp. Said flashlamp 14, as is well known in the art, is provided with material adapted, when a filament therein receives current, to burn rapidly with extremely bright light suitable for taking flashlight pictures. The lamp may only be used once since the material therein burns out and the glass of the bulb usually cracks or breaks.

When the snap switch 38 is closed, the filament in the bulb will not be energized since the terminal pieces 26 and 29 are insulated from one another, as fully described hereinafter. The circuit passes from the terminal piece 29 through the screw threaded member 24 to the screw threaded member 19, then through the coil spring 42 to the casing of the first battery 13, then through the batteries, to the terminal piece 37, the switch 38 and the central contact 36 of the shell; then through the lamp to the wire 40 and to the band 23 and terminal member 26.

Means is provided for energizing the flashlamp simultaneously with the actuation of the shutter 11. To this end, there is mounted on the annular shutter frame or housing 50, a switch member 51 now to be described. Said member 51 comprises a tubular casing 52 made of insulating material and having outer threaded portions 53 and 54 adjacent the ends thereof. Screwed to the end 53 is a metal cap member 54a having an end wall 54b formed with an axial projection 55 extending outwardly therefrom and formed with an outer thread 56. The threaded portion 56 is adapted to be screwed to the usual internally threaded opening 57 in the shutter frame 50.

In cameras of the kodak type for example, the shutter frame is provided with a screw threaded opening 57 for receiving the screw threaded end 58 of the usual flexible plunger 59 for actuating the shutter mechanism. The plunger 59 may be of ordinary construction, and comprises an outer tubular flexible casing 60 and a flexible plunger rod or wire 61, slidably mounted therein. The rod 61 extends from the end 62 of the tubular casing and is provided with a head 63. In accordance with the present invention however, a metal cap 65 is screwed to the screw threaded portion 54 of said insulated tube 52, said cap 65 having an end wall 66 from which there projects an outwardly extending internally threaded portion 67 for receiving the screw threaded end 68 of the plunger.

Extending from said end wall 66 toward said cap member 54a is an axial sleeve 70 provided with a pair of diametrically disposed longitudinal slots 71 and 72. Slidably mounted within said sleeve 70 is a rod 74 adapted to project through an axial opening 75 formed in said projection 55. Fixed to the end of the rod 74 adjacent the end wall 66 is a metallic circular ring 76 attached to said rod by means of spokes 77 extending through said slots 71 and 72. A small coil compression spring 78 housed within the sleeve 70 is interposed between said spokes 77 and the end wall 54b of cap 54a.

It will now be understood that upon pressing the plunger head 63, the plunger rod or wire 61 will move the rod 74 and its annular ring 76 toward the right, looking at Fig. 3, for compressing the spring 78. The free end of the rod 74 is adapted to actuate the shutter mechanism in the same manner as the plunger rod or wire 61. A ring 80 may be fixed to the interior of the tubular casing 52 by means of a terminal screw 81. A wire 82 may connect the terminal screw 81 with the terminal member 26. A terminal screw 83 screwed to the cap 54a may be connected by wire 84 to the other terminal member 29.

As will now be clear, upon actuating the plunger mechanism 59, the circuit for the flashlamp will be closed when the ring 76 contacts the ring 80, since the wire 82 connected to the terminal member 26 will then be electrically connected through said rings and through the rod 74 and cap 54a to the other wire 84 which is connected to the other terminal member 29.

The flashlamp 14 and the shutter 11 may be actuated simultaneously and positively by merely pressing the plunger 63. The switch 38 acts as a safety switch to prevent flashing of the lamp until the parts are all set up. The wires 82 and 84 may readily be housed within the camera. The switching member 51 may easily be removed from the camera and the wires 82 and 84 likewise detached from the fixed terminals 26 and 29.

It will be understood that the time of actuation of the switch with respect to the time of actuation of the shutter may be adjusted or synchronized by screwing the cap 54a with respect to the screw threaded portion 53 of the tubular insulating housing 52. By properly adjusting the cap 54a on the tube 52, the switch may be caused to close and the shutter actuated, either simultaneously or at a short period apart.

As illustrated in the drawings, the flashlamp 14 is provided with a suitable reflector 90 preferably made of paper, cardboard or the like flexible sheet material. Said member 90 may be formed from a single blank and comprises a central square section 91 formed with a central opening 92 for receiving the base of the lamp 14 therethrough. Extending from said central section 91 are preferably four wings 95, each having a rectangular section 96 and a pair of triangular shaped flaps 97 and 98 extending from the sides of said section 96. The wings 95 may preferably be folded about a creased line 99 and the flaps 97, 98 folded about creased lines 97a, 98a respectively. Each of the flaps 97 is preferably formed with a slit 100 extending from the outer edge 101 thereof, and the flap 98 formed with a slit 102 extending from a side edge 103 thereof. The slits 100 and 102 are so formed as to permit adjacent pairs of flaps 97 and 98 to be interlocked or interhooked as shown in Figs. 1 and 7. With this construction, the reflector may be folded to assume a cup shape for directing the rays of light from the flashlamp forwardly. The inner side of the member 90 is preferably formed with a suitable reflecting surface by painting, spraying or attaching a sheet of foil thereto or any other suitable manner.

It will now be understood that the slitted portions of the flaps 97, 98 may be unhooked and the member 90 then folded into generally prismatic shape for bringing the sections 96 at right angles to the section 91, and bringing the flaps 97 and 98 extending from one section 96 into superimposed position against the adjacent sections 96. The folded reflector with the lamp mounted therein may then be inserted into a usual four sided tubular paper or cardboard shipping container 110 preferably provided with a corrugated inner lining 111 for retaining the folded reflector and the lamp against sliding movement. The containers 110 with the reflectors and lamps therein may be packed in cases and shipped and stored. For using the lamp, it is merely necessary to remove the reflector with the lamp from the container, the reflector then being unfolded and interhooked as shown in Figs. 1 and 7. After the lamp has been used, the bulb thereof usually cracks and the reflector then serves as suitable means for wrapping and holding the lamp and to prevent bits of the glass bulb from being scattered.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawings, is to be interpreted as illustrative, and not in a limiting sense.

Having thus described my invention, I claim as new and desire to secure by Letters Patent:

1. In combination with a camera having a side wall and a lens shutter mechanism, said side wall having an opening, a casing having a projection at one end extending through said opening, a battery within said casing, a screw threaded shell mounted on said casing, an electric flash lamp having a base screwed to said shell, a member mounted on said shutter having means for operating said shutter mechanism, an electric circuit interconnecting said battery and said screw shell, and a switch interposed in said circuit and forming part of said member, adapted to be closed simultaneously with the operation of said actuating mechanism.

2. In combination with a camera having a shutter mechanism and a side wall formed with an opening, an internally screw threaded metallic member fixed within said opening, a casing having an end wall formed with a screw threaded projection screwed within said internally screw threaded opening, an insulating member attached to said screw threaded projection and having a metallic contact portion thereon, a metallic spring contact attached to said side wall and adapted to contact said portion, a battery within said casing, a receptacle for a lamp mounted on said casing, a switch mounted on said shutter mechanism and having a pair of terminals, one of said terminals being interconnected by a conductor to said spring contact and the other terminal being connected by a conductor to said internally screw threaded member, and means for interconnecting said internally screw threaded member and portion in circuit with said battery and receptacle.

3. In combination with a camera having a shutter mechanism and a side wall formed with an opening, an internally screw threaded metallic member fixed within said opening, a casing having an end wall formed with a screw threaded projection screwed within said internally screw threaded opening, an insulating member attached to said screw threaded projection and having a metallic contact portion thereon, a metallic spring contact attached to said side wall and adapted to contact said portion, a battery within said casing, a receptacle for a lamp mounted on said casing, a switch mounted on said shutter mechanism and having a pair of terminals, one of said terminals being interconnected by a conductor to said spring contact and the other terminal being connected by a conductor to said internally screw threaded member, means for interconnecting said internally screw threaded member and portion in circuit with said battery and receptacle, and means for simultaneously closing said switch and actuating said shutter mechanism.

4. In combination, a camera having a shutter therein, a pair of terminals attached to the wall of said camera, a casing demountably attached to said wall, and having a pair of terminals adapted to automatically engage said first mentioned pair of terminals upon attaching said casing to said wall, a battery within said casing, a screw shell mounted within said casing, means for electrically interconnecting said battery and shell to said second pair of terminals, a photographic flash-lamp bulb having a base screwed to said shell, a switch mounted on said camera shutter, means for simultaneously closing said switch and actuating said shutter, and a pair of wires interconnecting the terminals of said switch with said first mentioned pair of terminals.

MORRIS SCHWARTZ.